UNITED STATES PATENT OFFICE 2,070,202

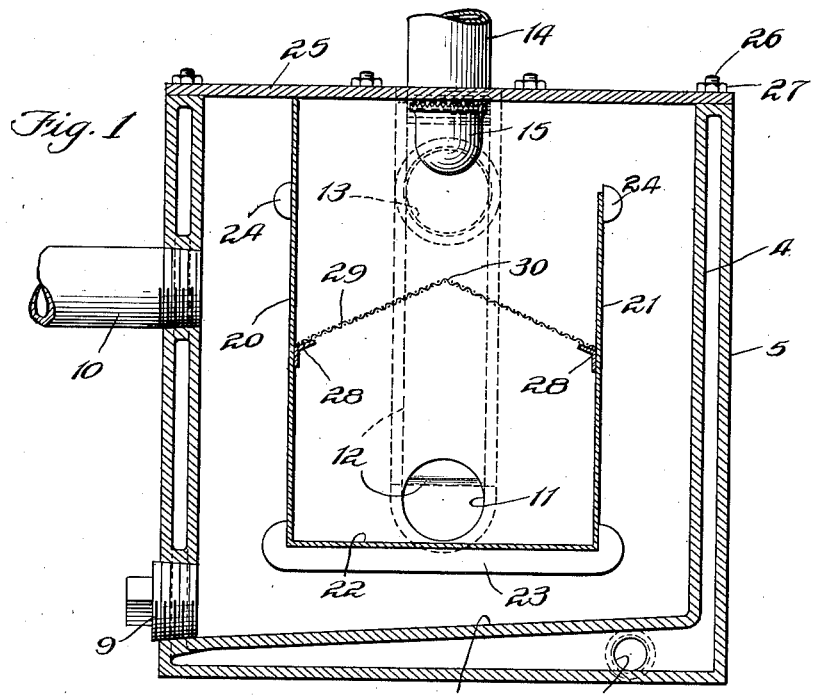
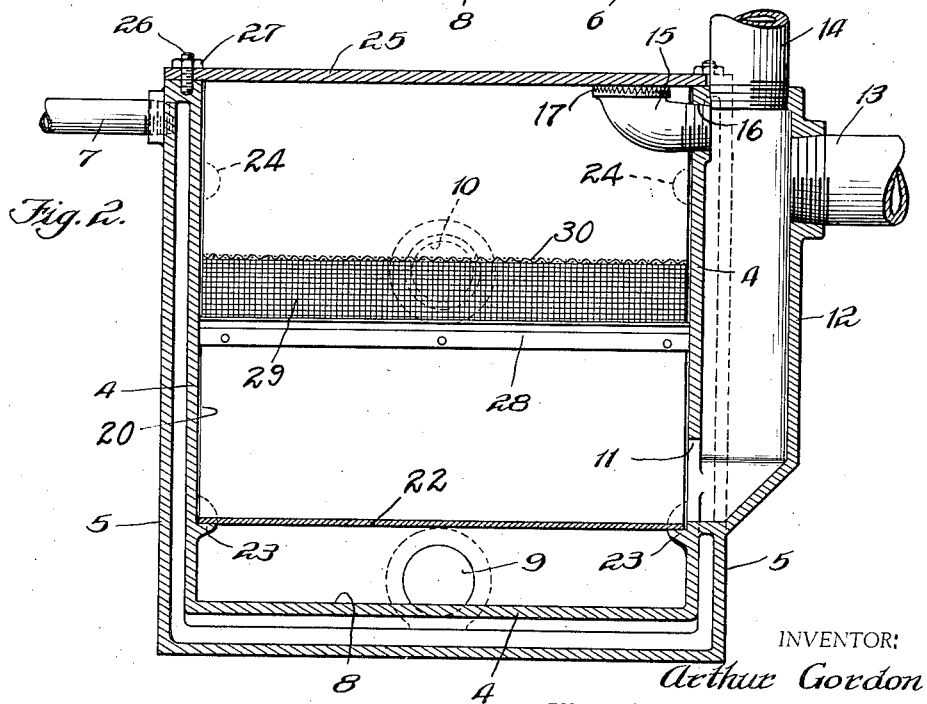

VACUUM BREAKER TRAP

Arthur Gordon, Chicago, Ill.

Application February 25, 1935, Serial No. 8,053

4 Claims. (Cl. 210—56)

This invention relates in general to a separator for treating waste water from kitchens, packing houses, slaughter houses, and the like, for the removal of fat, grease, and other foreign matter from such water, for preventing a back flow of gases through the waste water pipes and to prevent a siphoning action of liquid from the separator itself.

The principal object of the invention is in the provision of a novel apparatus of the character described for treating waste water, for collecting grease or other solid or semi-solid matter therefrom, and for preventing the emptying of a certain amount of sealing water from the trap by a siphoning action.

A further object of the invention is in the provision of a new and improved structure comprising a removable trap member which is held in place by the top of the separator.

A further object of the invention is in the provision of a combined vacuum breaker and gas vent and an anti-siphoning connection with the outlet to prevent removal of the return gas sealing liquid from the interior of the trap or separator.

Other objects of the invention will appear hereinafter, the accompanying drawing illustrating a preferred embodiment of the invention in which Fig. 1 is a sectional view of a trap constructed in accordance with the principles of this invention; and Fig. 2 is a transverse sectional view of the structure shown in Fig. 1.

In a separator trap of this kind it is desirable not only that the separation of the grease or other material from the water is effected in a continuous manner but also that the dirt collecting parts of the trap are easily removed for cleaning and replacement.

Another objectionable feature in traps of this kind which are used in connection with residences and other buildings is that under certain conditions there is danger that the sealing liquid or a sufficient portion thereof is withdrawn by a siphoning action from the trap casing which allows any back flowing gas to pass directly through the trap in a reverse direction and through the waste water inlet. In the present invention means is provided for preventing not only a siphoning action but also any removal of surplus liquid below a certain outlet level and provision is also made for an additional outlet or overflow for surplus liquid, for allowing the escape of any gas which may have collected in the trap itself or for a direct passage to an atmospheric outlet of any gas which may flow backwardly through the outlet rather than allowing such gas to pass into and through the trap in a reverse direction.

Referring now more particularly to the drawing, a trap casing of generally rectangular, circular or any other desired form is provided with inner and outer walls 4 and 5 which form a cooling jacket entirely around the casing. At the lowest point of the jacket is an inlet 6 for a cooling liquid and at the upper portion of the jacket is an outlet 7 for the liquid. A bottom portion 8 of the inner wall is preferably inclined and a drain plug 9 and an opening therefor is provided through which the interior of the casing may be flushed for cleaning.

Extending through one side of the casing at a distance intermediate the top and bottom thereof is an inlet pipe 10 for discharging the waste water containing grease and other foreign matters which are separated in the trap and at right angles thereto or in one of the adjacent sides if the trap is right angular as shown, is an outlet opening 11 which is disposed below the inlet 10. This outlet 11 communicates with a tubular extension 12 located externally of the inner wall of the casing and extending to the top thereof where an overflow pipe 13 communicates with the extension 12, the lower portion of the pipe 13 being a short distance above the upper portion of the inlet pipe 10 to maintain a certain amount of liquid in the trap at all times which acts as a seal for the back flow of odors and gases. Communicating with the top of the tubular extension 12 is an atmospheric pipe 14 and in the inner wall of the casing is a vacuum breaker and anti-siphoning opening 16 in which is threaded one end of an angular or elbow fitting 15, the other end having a toothed edge 17 which extends upwardly adjacent the top of the casing. This toothed edge 17 prevents a lid or cover 25 from closing the air or gas outlet, it retards the closure of a passage through the elbow 15 by accumulating grease or dirt, and it provides a direct passage from the top of the trap to the atmospheric outlet 14.

Disposed within the casing and between the inlet and outlet is a separator comprising a plate bent to substantially U-shape and having one side 20 longer than the opposite side 21 and joined by a bottom 22 continuous with the sides. This separator may be secured in the trap but preferably it is removably engaged at opposite ends thereof by a bottom rib 23 and upper lugs 24 between and by which it is supported and held in place at each end, and the rib 23 at one end being just below the outlet opening 11 so that the outlet is located at one end of the bottom of the separator. The longer side 20 of the separator extends to the top of the casing where it is engaged by a lid or cover 25 thereof which is removably held in place by stud bolts 26 and fastening nuts 27. Within the separator and secured to the opposite sides thereof are rails or supports 28 preferably inclined upwardly to support the downwardly inclined sides of a separator screen 29 which has a ridge or high portion 30 intermediate the sides thereof so that grease or other material which engages the screen will gravitate to the lower sides of the screen against the sides of the separator, thereby leaving the higher intermediate portion of the screen unobstructed for a longer period of time and until it too is covered.

The shorter side 21 of the separator terminates above the opening of the overflow pipe 13 but below the lower edge of the vacuum breaker opening 16 so that the passage of any liquid entering the casing is from the inlet pipe 10 downwardly along the side 20 of the separator across at the bottom thereof and normally over the upper edge of the shorter side 21, through the screen 29 and outwardly through the discharge opening 11. If the outlet is clogged or the incoming liquid flows in too rapidly an additional outlet is provided by the anti-siphoning fitting 15 which admits the liquid directly to the overflow pipe without passing through the screen 29 nor the discharge outlet 11. By having this vacuum breaker opening 15 in the casing it is impossible for the overflow pipe to siphon out the liquid from the casing which insures that there will be sufficient sealing liquid in the trap to cover the inlet pipe 10 and prevent any back flowing gas to pass from the inlet through a house or dwelling. At the same time a gas escapement connection is provided for the top of the casing and also communicating with the overflow pipe 13 because of the atmospheric pipe 14 extending from the top of the tubular extension 12.

This trap is entirely automatic in its operation, it has a removable separator and a screen which are easily withdrawn and replaced by simply taking off the cover; the trap may be heated or cooled by means of the jacket if desired, to coagulate or to solidify the grease, and the casing itself may be easily flushed and cleaned through the plug opening 9.

I claim:

1. In a trap of the class described, a jacketed casing having an inlet and outlet and opposite inward projections spaced from the bottom and adjacent sides, a plate with unequal sides and a connected bottom removably seated at its ends in the projections and the longer side extending to the top of the casing adjacent the inlet side, a cover to engage this longer side and close the inlet side of the separator, the outlet comprising a hollow extension at one end of the separator extending upwardly along the side of the casing, an overflow pipe extending from the side of the upper end of the extension, an atmospheric pipe extending upwardly from the top of the extension, a removable screen in the separator above the inlet opening, a vacuum breaker connection comprising an opening in the wall of the casing communicating with the top of the said hollow extension and an elbow fitting in the opening and extending upwardly with a toothed edge just below the cover to prevent the cover from closing the outlet to the atmospheric pipe.

2. In a trap of the class described, a casing having an inlet and an outlet, a separator in the casing between the inlet and the outlet, means forming a tubular passage extending upwardly from the outlet to the top of the casing, an overflow outlet and a gas escape outlet for the casing comprising an opening at the top of the casing communicating with the tubular extension and a fitting extending from the opening to the top of the casing, and having a toothed upper edge, a cover for the casing which extends just above the toothed edge of the fitting, the toothed edge of the fitting preventing the cover from closing the opening to the tubular extension.

3. In a trap of the class described, a casing having an inlet and an outlet, a separator in the casing between the inlet and outlet, the outlet having an opening at the bottom of the separator and including a hollow extension at the end of the casing with an overflow pipe adjacent the top thereof and an atmospheric outlet at the top, a cover for the casing, and an overflow and gas outlet from the casing to the tubular extension comprising an opening in the wall of the casing communicating with the extension and an elbow fitting having one end engaging the opening and the other end extending upwardly adjacent the top and spaced from the top to prevent clogging this opening and to provide the highest exit for gas to the atmosphere from the interior of the casing.

4. In a trap of the class described, a casing having an inlet and an outlet, a separator in the casing between the inlet and outlet, the outlet having an opening at the bottom of the separator and a hollow extension outside of the casing projecting upwardly to the top of the casing, means forming an overflow adjacent the top of the extension and an atmospheric outlet at the top of the extension, a screen in the separator above the outlet, the casing having an opening in the wall communicating with the extension adjacent the top thereof, an elbow fitting having one end secured in the opening and the other end having a toothed edge extending upwardly adjacent the top of the casing, a cover fitting over the casing but not over the extension, and providing an outlet space about the toothed edge of the fitting, the said fitting and the said hollow extension forming also an emergency overflow to the outlet and an exit for gas above the screen and above the lower edge of the overflow pipe.

ARTHUR GORDON.